United States Patent [19]
Davis et al.

[11] 3,960,442
[45] June 1, 1976

[54] OPHTHALMIC LENS SERIES

[75] Inventors: John King Davis, East Woodstock, Conn.; Henry Grant Fernald, Winchester, Mass.

[73] Assignee: American Optical Corporation, Southbridge, Mass.

[22] Filed: Aug. 5, 1974

[21] Appl. No.: 494,784

[52] U.S. Cl.................................. 351/176; 351/159
[51] Int. Cl.².......................................... G02C 7/02
[58] Field of Search..................... 351/176, 159, 167

[56] References Cited
UNITED STATES PATENTS

| | | | |
|---|---|---|---|
| 3,169,247 | 2/1965 | Davis et al. | 351/167 |
| 3,434,781 | 3/1969 | Davis et al. | 351/159 |

*Primary Examiner*—David H. Rubin
*Attorney, Agent, or Firm*—H. R. Berkenstock, Jr.; William C. Nealon

[57] ABSTRACT

A general purpose ophthalmic lens series incorporating an aspheric, atoric design concept which allows the selection of lens base curves substantially independently of traditional field of view or marginal error performance criteria. Factors of sensitivity of field errors to fitting distance, shape magnification, geometric distortion, eyelash clearance, reflections, applicability to large spectacle frames and general cosmetic appearance are optimized by base curve selection and field corrections are attended to by aspherizing one or both surfaces of the lenses.

19 Claims, 13 Drawing Figures

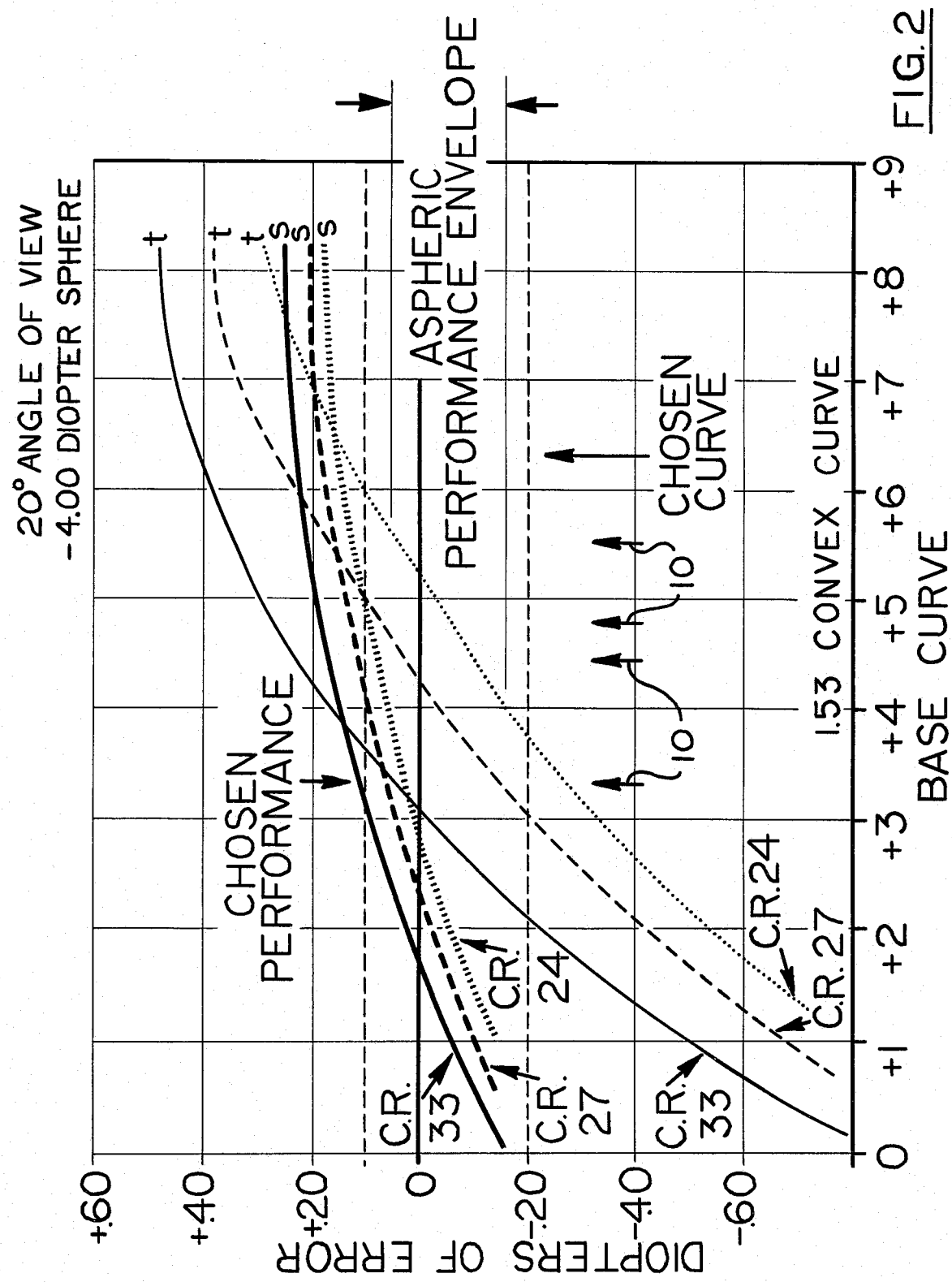

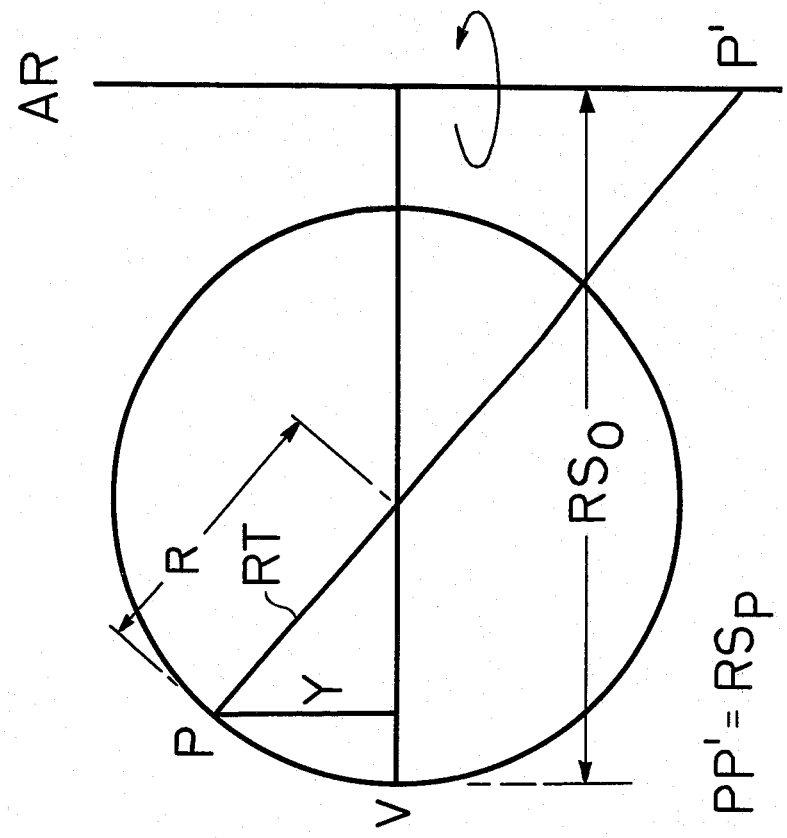

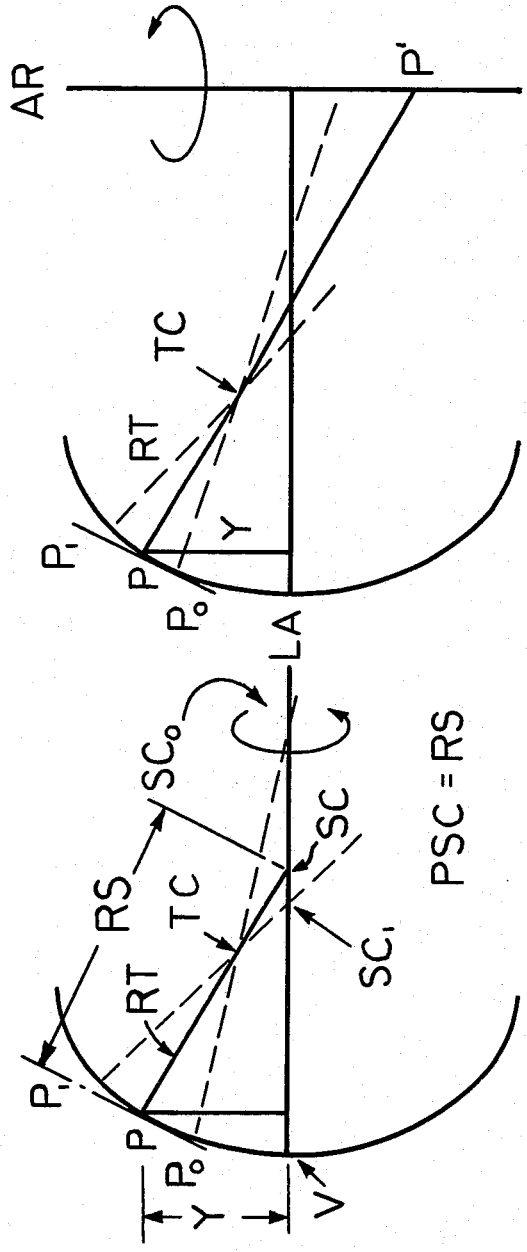
FIG. 4D
FIG. 4C
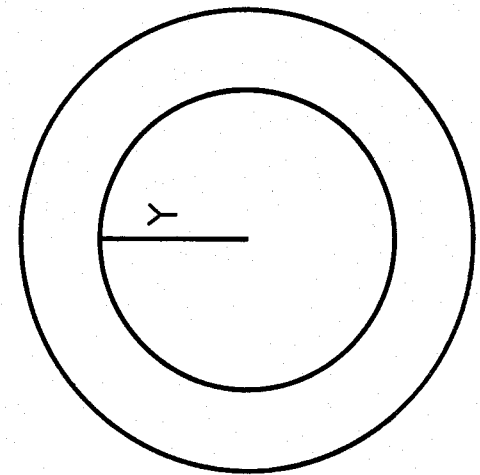
FIG. 4E

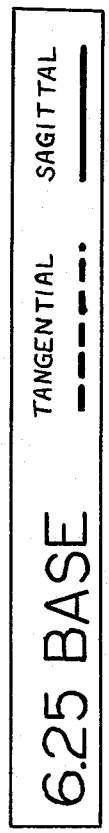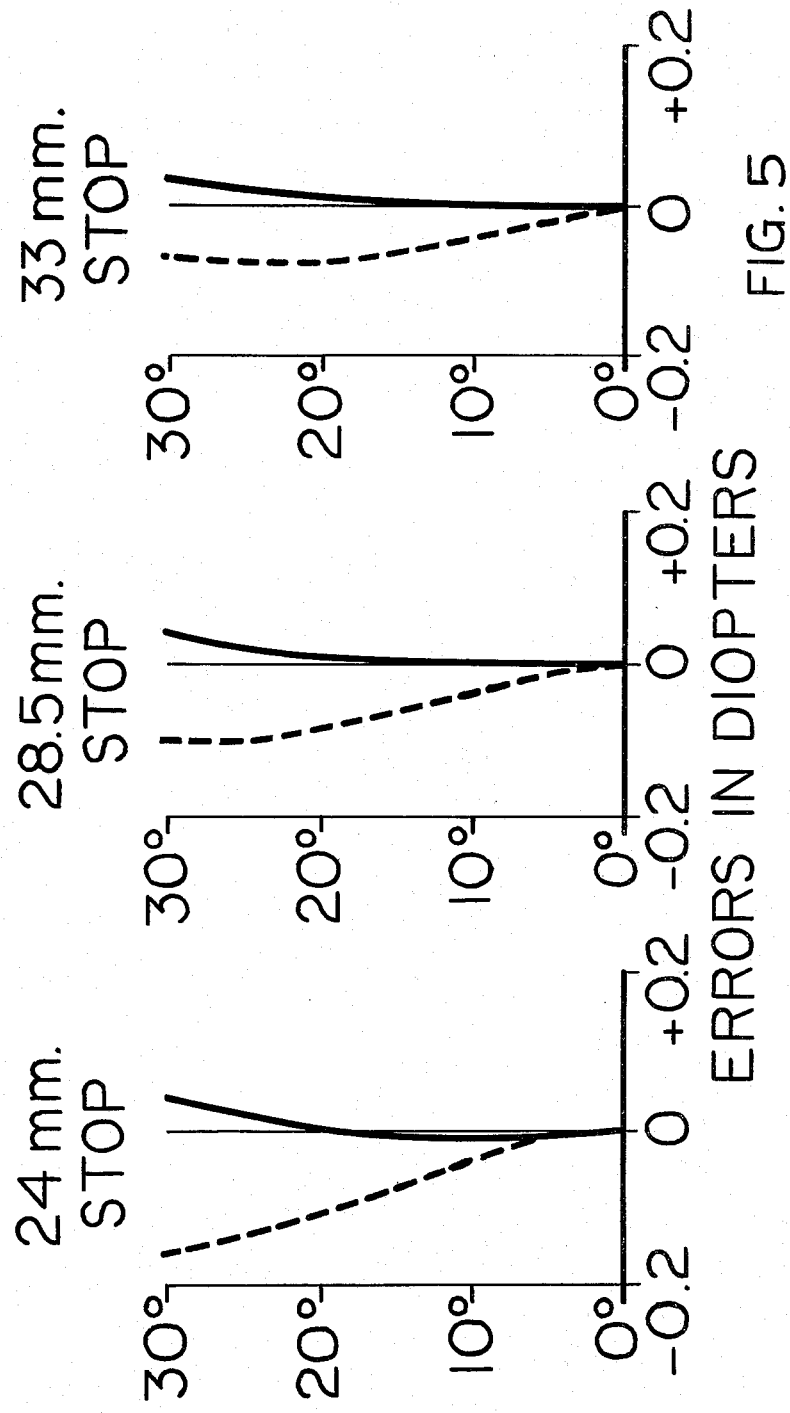
FIG. 5

PLUS LENSES

| BASE | SPHERE | THK. | CYLINDER ||||||||||||| 
|---|---|---|---|---|---|---|---|---|---|---|---|---|---|---|
| | | | 0 | -0.25 | -0.50 | -0.75 | -1.00 | -1.25 | -1.50 | -1.75 | -2.00 | -2.25 | -2.50 | -2.75 | -3.00 |
| C | 10.00<br>9.75<br>9.50<br>9.25<br>9.00<br>8.75<br>8.50<br>8.25 | 9.3<br>9.1<br>8.8<br>8.6<br>8.4<br>8.2<br>8.0<br>7.8 | | | | | | | | | | | | | |
| J | 8.00<br>7.75<br>7.50<br>7.25<br>7.00<br>6.75<br>6.50<br>6.25 | 8.7<br>8.5<br>8.2<br>8.0<br>7.7<br>7.5<br>7.2<br>7.0 | | | | | | | | | | | | | |
| A | 6.00<br>5.75<br>5.50<br>5.25<br>5.00<br>4.75<br>4.50<br>4.25<br>4.00<br>3.75 | 7.6<br>7.3<br>7.0<br>6.7<br>6.5<br>6.2<br>5.9<br>5.6<br>5.4<br>5.1 | | | | | | | | | | | | | |
| L | 3.50<br>3.25<br>3.00<br>2.75<br>2.50<br>2.25<br>2.00<br>1.75<br>1.50<br>1.25 | 5.3<br>5.0<br>4.7<br>4.4<br>4.1<br>3.8<br>3.5<br>3.2<br>2.9<br>2.6 | | | | | | | | | | | | | |
| K | 1.00<br>0.75<br>0.50<br>0.25 | 2.4<br>2.2<br>2.2<br>2.2 | | | | | | | | | | | | | |

| BASE DIV. | 1.53 BACK CURVE | LENS DIA. |
|---|---|---|
| C | -4.25 | 54 |
| J | -4.75 | 58 |
| A | -4.75 | 62 |
| L | -5.25 | 65 |
| K | -6.00 | 65 |

FIG. 8A

MINUS LENSES

| BASE | SPHERE | THK. | \multicolumn{13}{c|}{CYLINDER} |
|---|---|---|---|---|---|---|---|---|---|---|---|---|---|---|---|
| | | | 0 | -0.25 | -0.50 | -0.75 | -1.00 | -1.25 | -1.50 | -1.75 | -2.00 | -2.25 | -2.50 | -2.75 | -3.00 |
| T | 0.00 | 2.2 | | | | | | | | | | | | | |
| | 0.25 | 2.2 | | | | | | | | | | | | | |
| | 0.50 | 2.2 | | | | | | | | | | | | | |
| | 0.75 | 2.2 | | | | | | | | | | | | | |
| V | 1.00 | 2.2 | | | | | | | | | | | | | |
| | 1.25 | 2.2 | | | | | | | | | | | | | |
| W | 1.50 | 2.2 | | | | | | | | | | | | | |
| | 1.75 | 2.2 | | | | | | | | | | | | | |
| | 2.00 | 2.2 | | | | | | | | | | | | | |
| X | 2.25 | 2.2 | | | | | | | | | | | | | |
| | 2.50 | 2.2 | | | | | | | | | | | | | |
| | 2.75 | 2.2 | | | | | | | | | | | | | |
| Z | 3.00 | 2.2 | | | | | | | | | | | | | |
| | 3.25 | 2.2 | | | | | | | | | | | | | |
| | 3.50 | 2.2 | | | | | | | | | | | | | |
| Y | 3.75 | 2.2 | | | | | | | | | | | | | |
| | 4.00 | 2.2 | | | | | | | | | | | | | |
| | 4.25 | 2.2 | | | | | | | | | | | | | |
| | 4.50 | 2.2 | | | | | | | | | | | | | |
| | 4.75 | 2.2 | | | | | | | | | | | | | |
| | 5.00 | 2.2 | | | | | | | | | | | | | |
| H | 5.25 | 2.2 | | | | | | | | | | | | | |
| | 5.50 | 2.2 | | | | | | | | | | | | | |
| | 5.75 | 2.2 | | | | | | | | | | | | | |
| | 6.00 | 2.2 | | | | | | | | | | | | | |
| | 6.25 | 2.2 | | | | | | | | | | | | | |
| | 6.50 | 2.2 | | | | | | | | | | | | | |
| | 6.75 | 2.2 | | | | | | | | | | | | | |
| | 7.00 | 2.2 | | | | | | | | | | | | | |
| I | 7.25 | 2.2 | | | | | | | | | | | | | |
| | 7.50 | 2.2 | | | | | | | | | | | | | |
| | 7.75 | 2.2 | | | | | | | | | | | | | |
| | 8.00 | 2.2 | | | | | | | | | | | | | |
| | 8.25 | 2.2 | | | | | | | | | | | | | |
| | 8.50 | 2.2 | | | | | | | | | | | | | |
| | 8.75 | 2.2 | | | | | | | | | | | | | |
| | 9.00 | 2.2 | | | | | | | | | | | | | |
| | 9.25 | 2.2 | | | | | | | | | | | | | |
| | 9.50 | 2.2 | | | | | | | | | | | | | |
| | 9.75 | 2.2 | | | | | | | | | | | | | |
| | 10.00 | 2.2 | | | | | | | | | | | | | |

| BASE DIV. | 1.53 BACK CURVE | LENS DIAM. |
|---|---|---|
| T | -6.75 | 65 |
| V | -7.75 | 65 |
| W | -8.75 | 65 |
| X | -9.75 | 65 |
| Z | -9.75 | 58 |
| Y | -10.25 | 65 |
| H | -11.21 | 58 |
| I | -12.02 | 58 |

OPHTHALMIC LENS SERIES

BACKGROUND OF THE INVENTION

1. Field of the Invention:

Spectacle and eyeglass lenses with particular reference to an improved general purpose lens series employing an aspheric, atoric design concept.

2. Description of the Prior Art:

The ophthalmic lens art includes much theory concerning correction for astigmatism with and without consideration of power change and the provision of lenses in multibase series. U.S. Pat. Nos. 989,645; 1,315,667; 1,438,820 and 1,438,827 are exemplary of early design work.

More comprehensive lens design work was disclosed by Tillyer in U.S. Pat. No. 1,588,559 which illustrates how lenses are computed.

The idea that the distance to the center of the eye which enters into the calculations, should be varied according to the power of the lens was introduced by Hill and Tillyer, U.S. Pat. No. 1,315,667 and Tillyer U.S. Pat. No. 2,391,045 which were both involved with compromising the correction between astigmatism and power change.

Davis et al U.S. Pat. Nos. 3,434,781 and 3,169,247, which respectively deal with matters of a negative toric lens series and an aspheric lens series for aphakic patients, delved still further into matters of ray tracing in lens design work and correction or minimization of errors of oblique fields while taking into consideration the various different physiological dimensions of different eyes.

Traditional design objectives in terms of tangential and sagittal meridional power errors for lenses have placed a priority on maintaining these errors below visually significant values leaving little freedom in choice of base curve, even for a single center of rotation distance.

The fundamental philosophy of designers having heretofor been to maintain tangential and sagittal meridional power errors within reasonable limits as a dominant consideration has resulted in their having to ignore other lens performance characteristics. Distortion, reflections, cosmetic appearance, magnification and magnification differences between the two eyes were secondary considerations and exemplary of those usually having to be ignored. The limitation on choice of curvature is even more acute if a range of center-of-rotation distances is considered rather than a single one.

From a study of aspherics (aspheric surfaces) it has been found that their use heretofor in the normal non-aphakic prescription range has not resulted in a major improvement of the traditional corrections. In these ranges of conventional design practices, aspheric surfaces can, at best, provide only slight improvement of meridional power errors.

In view of the fact that aspheric surfaces do offer the freedom to obtain one's "best choice" within a wide range of base curve selections, a principal objective of this invention is to apply the base curve as a new variable which may be used to achieve other design goals. Exemplary of these are the following lens performance characteristics which are a function of base curve and base curve changes:

a. Shape magnification and shape magnification differences between adjacent base curves b. Sensitivity of field errors to fitting distances
c. Geometric distortion
d. Applicability to large spectacle frames and cosmetic appearance in general
e. Eyelash clearance
f. Reduction of reflections

SUMMARY OF THE INVENTION

The foregoing objective and its corollaries are accomplished in the general purpose lens series of this invention by the provision of an aspheric, atoric lens series design wherewith the selection of base curves is made substantially independently of traditional field of view or marginal error criteria, and field corrections are "fine-tuned", i.e. attended to, by aspherizing one or both surfaces of the lenses. According to one aspect of the invention, the selected base curves are applied to the ocular sides of the lenses, i.e. lenses in the series are supplied with multibase curvatures on their concave sides and finishing to individual prescriptive requirements is, at least in part, accomplished by working the convex or object sides of the lenses.

Details of the invention will become more readily apparent from the following description when taken in conjunction with the accompanying drawings.

IN THE DRAWINGS

FIG. 2 is a chart indicating the optical performance of a −4.00 diopter spherical lens prescription in terms of its tangential and sagittal power errors;

FIGS. 3A, 3B are schematic illustrations of conventional circular lens geometry as it is considered in design work;

FIGS. 4C, 4D and 4E are schematic illustrations of aspheric and atoric lens geometry;

Figure 6:
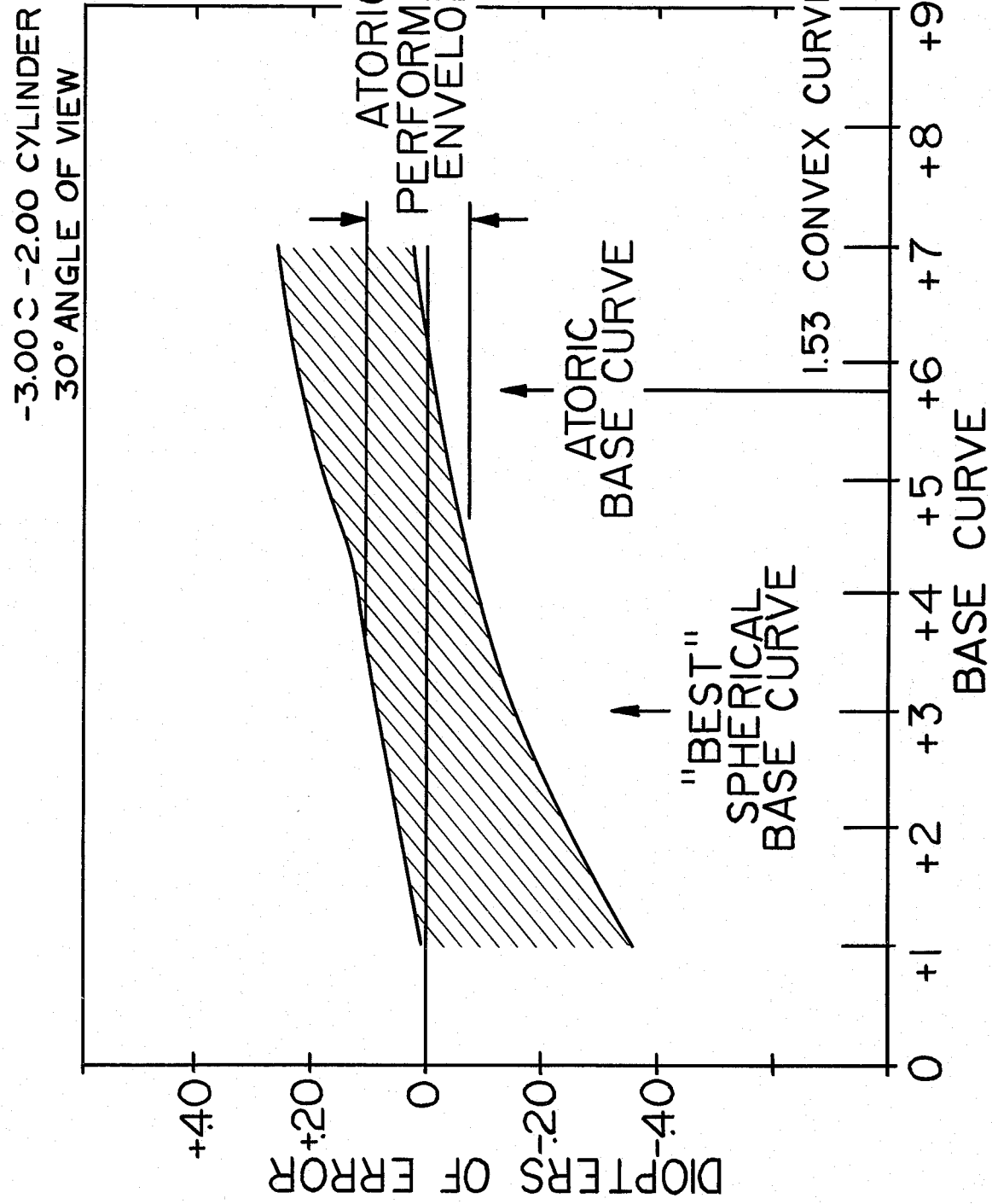
Figure 7:
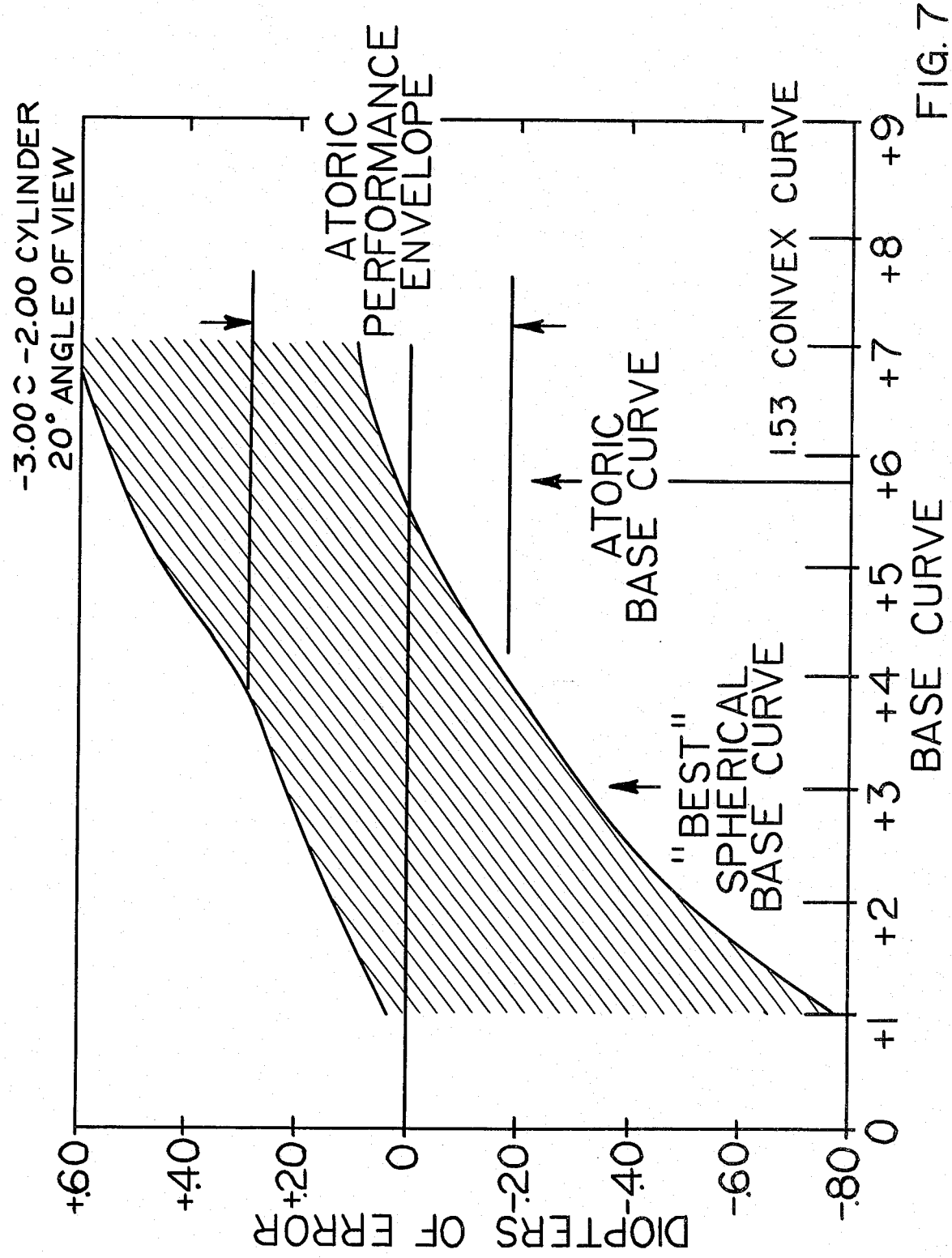

FIG. 5 contains "field fan" graphs which illustrate the performance of a lens from its center outward, field angles being the vertical ordinate and lens performance the horizontal;

FIG. 6 is a base curve selection graph illustrating possibilities available for the selection of base curves in designing toric lens prescriptions for maximum performance at a 20° angle of view;

FIG. 7 is a graph similar to FIG. 6 for a 30° angle of view;

FIGS. 8A and 8B are two parts of a base curve selection table defining representative layouts of groups of prescriptive powers each with its own base curve to be used according to the invention; and FIG. 9 is a modified base curve selection table.

DESCRIPTION OF THE PREFERRED EMBODIMENTS

For ease in understanding principles of the present invention traditional goals of lens design and limitations imposed by conventional geometry will be briefly reviewed.

Figure 1:
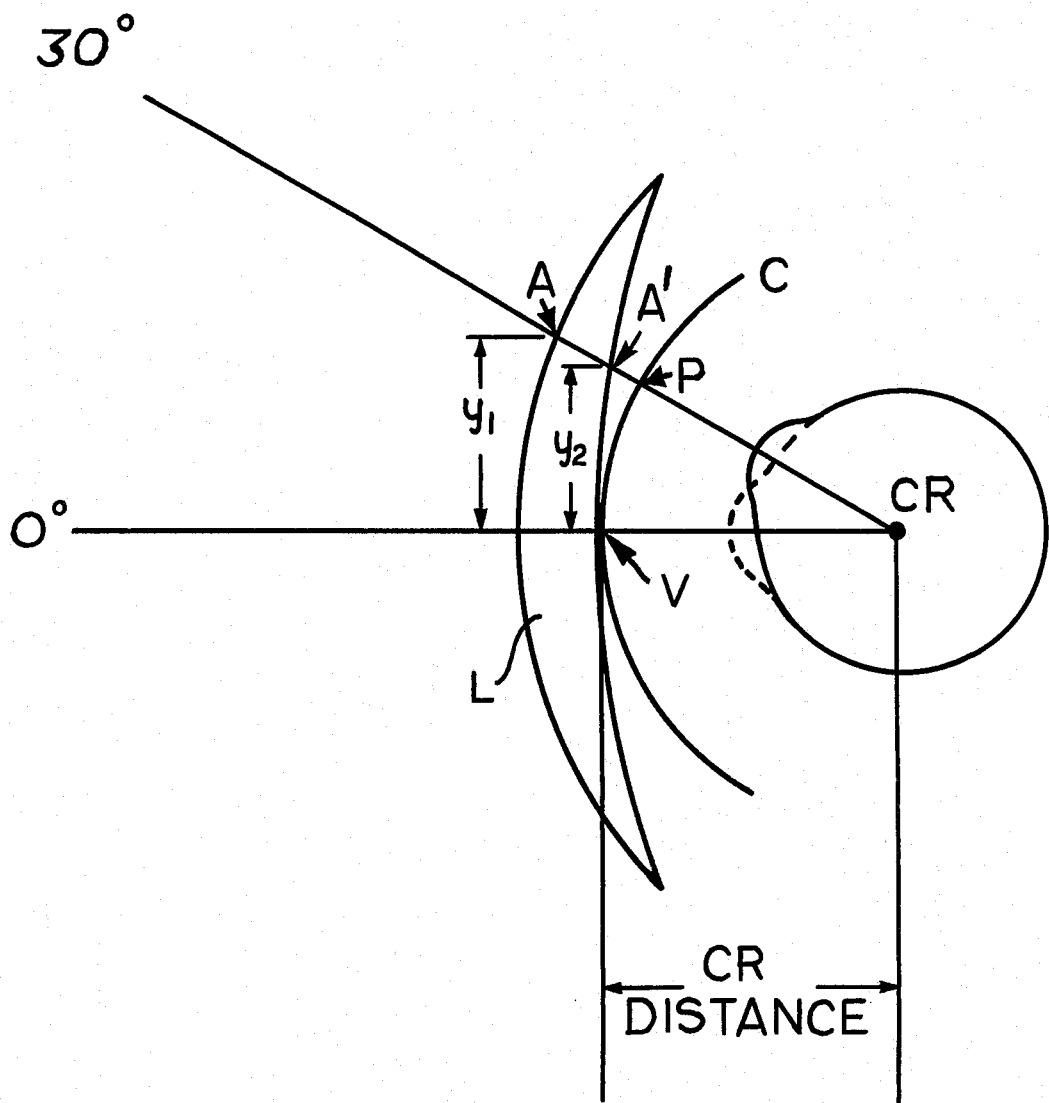
FIG. 1 is a schematic illustration of traditional geometry and assumptions basic to spectacle lens design.

FIG. 1 illustrates the traditional geometric assumptions basic to spectacle lens design. Point P is a point on the reference sphere C at which it would be desirable to present the same optical corrections as are present at the vertex V of lens L. Problems associated with this endeavor are classical and reported in the literature, e.g. Bechtold, Edwin W. "The aberrations of ophthalmic lenses", Am. Jl. of Op. and Arch. Am. Acad. Optom, 35 (1) 10–24, 1958; Davis, John K., Henry G. Fernald, and Arline W. Rayner, "An analysis of ophthalmic lens design", *Am. J. of Op. and Arch. Am. Acad Optom.* 41 (7) 400–421, 1964; Davis, John K., Henry G. Fernald, and Arline W. Rayner, "The design of a general purpose single vision lens series" *Am. Jl. of Op. and Arch. Am. Acad. Optom.*, April 1965; and Davis, John K. "Stock lenses and custom design", *Am. Jl. of Op.*, December, 1967.

FIG. 2 displays the results of the traditional calculations and indicates in terms of the tangential $t$ and sagittal $s$ meridional power errors the performance possible for a −4.00 spherical prescription. Data is given for three ocular vertex to center-of-rotation CR distances. A tolerance zone of +0.10 to −0.20 is indicated by horizontal dash lines.

It is immediately obvious that all errors cannot be reduced to zero. For a 27 mm center of rotation distance (CR 27), errors remain in the tolerance zone for base curves between +3.00 and +4.00 diopters. However, when the center of rotation distance changes, the performance changes. Some current base curve choices for hard resin lenses are indicated with arrows 10; they range from approximately +3.25 to +5.50 diopters. The difference in lenses produced by various manufacturers stem from differences in the type of compromise favored by their designers and in the assumption of center-of-rotation distance or range of distances for which the compromise will be balanced. However, it can be seen in FIG. 2 that if priority is placed on maintaining these errors below visually significant values, there is little freedom in choice of base curve, even for a single center of rotation distance.

In the matter of the use of aspherics and atorics with the base curve as a new variable to achieve improved design according to this invention, the following brief study of the geometry of aspheric surfaces will serve to render the crux of the invention more easily understandable:

FIGS. 3A and 3B and 4A and 4B illustrate the differences between surfaces of circular geometry and those of noncircular (toric) geometry.

FIG. 3A shows a circular cross-section of radius R. If we think of this as a cutting tool rotating about the axis LA to sweep a surface perpendicular to the paper, a spherical surface will be generated with its center at the center 12 of the circle.

FIG. 3B also shows a circular cross-section of radius R. However, if that cross-section is rotated to sweep a surface perpendicular to the paper about an axis AR, at a distance other than R from the circular surface, a toric surface will be generated. The "spherical" or base radius will be $RS_0$ (this is the radius of curvature in the meridian perpendicular to the paper). The cross-sectional radius is that of the circle. At point P, a distance Y above the vertex V of the surface, the cross-sectional radius will remain the same, R. It is labeled RT, since it is also the radius of curvature for the tangential focal power of that surface at the point P. The radius of curvature for the sagittal focal power is the distance P P', which is the sagittal radius $RS_p$. $RS_p$ then is a variable depending on y, the distance from the center. In torics where $RS_0$ is longer than R, $RS_p$ is longer than $RS_0$; in torics where $RS_0$ is shorter than R, $RS_p$ will be shorter than $RS_0$.

Referring now to aspheric and atoric geometry, FIG. 4C is analogous to FIG. 3A in that the curvature at the vertex V has a radius equal to R of FIG. 3A but at any other points, such as P, the radius may vary. The cross-sectional curvature can be altered at will so long as the curvatures at any three infinitely close adjacent points $P_0$, P and $P_1$ are connected smoothly and continuously to avoid "breaks" in the curve. In this drawing, the normal to the point P intersects the axis of rotation at SC. This line of length RS defines the radius of curvature of the surface in a direction in and out of the paper and around an arc of radius Y as shown in the face-on view of the lens (FIG. 4E). RS is the radius which determines the sagittal focal power of the surface at P. The difference between RS and the radius R, at the lens vertex, determines the sagittal asphericity of the surface.

In an aspheric surface, this RS is continually changing as we consider the adjacent points $P_0$, P, $P_1$. At $P_0$, the sagittal radius $RS_0$ is $P_0SC_0$ and at $P_1$, it is $P_1SC_1$. The crossing point of these different sagittal radii is TC. The distance from P to TC is the instantaneous radius of the surface at point P, in the plane of the paper, and is the radius of curvature which determines the tangential focal power of the surface at point P. RT is a function of the rate of change of RS. The greater the difference between them, the more aspheric and astigmatic the surface becomes. TC could be, and frequently is, below the axis LA, thus making RT longer than RS.

While at any point P one could draw any chosen arc of a desired tangential radius, to do so would alter all subsequent sagittal radii which depend on the slope of the curve. Thus, only certain relationships of the two radii are useful. RT or RS can be manipulated only to the extent that the reaction of the other is tolerable.

Mathematics and experience show that the extent of this restraint is such that what can be done is substantially defined by those combinations of lens errors which can be determined by a survey of spherical designs, e.g. as displayed in FIG. 2.

FIG. 2 illustrates what can be done. What is gained with aspherics designed according to this invention is the additional freedom to select the type of meridional power error compromise desired and then to use the base curve as a new variable to meet the other aforementioned criteria.

Since the aspheric changes in curvature which are required are small compared to the overall curvature and power of the lens, they can be applied to either the convex or concave surface, or divided between them with practically the same result.

The modification of toric surfaces by altering the cross-sectional curve which is swept along an arc to generate the toric surface is analogous to the spherical or axial symmetrical case discussed above. The same opportunities and restrictions apply. The generating cross-section of the atoric can be "aspherized" and used in combination with an aspheric on the other surface to achieve any desired tangential correction at both major meridians of a toric lens. Also, any balance of tangential and sagittal errors available with toric surfaces can be obtained with atorics in the base meridian (the meridian of sweep).

FIG. 4D is analogous to FIG. 3B but illustrating the atoric. As with aspherics, the major advantage of atorics, according to this invention, is the freedom of base curve choice to consider other design criteria as follows:

SHAPE MAGNIFICATION

Magnification varies directly with both base curve and thickness. In thick plus lenses, any extra curvature increases magnification and also tends to magnify the patient's eyes, as well as the size of images he sees. Magnification, therefore, is an unwanted by-product of a correction.

In minus lenses, the problem is somewhat reduced. The thickness of minus lenses is nominal and substantially constant. Accordingly, the actual front curvatures has less effect on total shape magnification.

Thus, there is reason for restricting the steepness of plus lenses and some freedom in the respect for minus lenses.

Shape magnification differences are controlled according to the invention by using a multiplicity of front curves with small steps between any two adjacent curves as can be seen from FIGS. 8A–8B and 9. With strategic choice of base curves, the maximum shape magnification difference at base curve boundaries may be held to a minimum.

SENSITIVITY OF FIELD ERRORS TO FITTING DISTANCES

In view of the wide range of spectacle sizes and styles presently in use, a considerable variation in fitting distances exists and should be taken into account.

When circular geometry is used, sensitivity to errors reduces as curves are steepened, while the errors themselves increase. This, as it is well known in the art is more of a problem in minus lenses then in plus lenses. Accordingly, this factor being of less importance for plus lenses is not per se a sufficiently strong reason for steepening plus lenses to the point where the bulkiness and magnification become excessive. However, sensitivity to fitting distance is, according to the invention, an important factor in the selection of base curves for minus lenses. While this tends to lead to relatively steep base curves, the resulting errors thereof are reduced by aspheric construction.

GEOMETRIC DISTORTION

Distortion is a lens by-product about which patients complain. This is especially true at a time of a change of prescription or frame. Complaints are more prevalent with minus lenses than with moderate plus prescriptions. Base curves may be the problem.

With aspheric surfaces, steeper curves can be used to reduce the distortion without increasing the "marginal errors".

Having considered the aforementioned refractive characteristics of performance, reasons for maintaining relatively shallow curvatures for plus lenses and relatively steep curvatures for minus lenses can be seen. How shallow and how steep are determined in the light of non-refractive properties, as well as the refractive ones discussed above.

COSMETIC APPEARANCE

Cosmetic appearance is a qualitative factor and, to a degree, it is modified by style trends and opinion. However, it can be said that lenses which distort the intended geometry of a spectacle frame detract from its cosmetic appearance.

Those frame which are designed with a "coquille", or curvature, in them best lend themselves to attractive mountings. Such frames are usually designed to fit a front curve of approximately +6.00 diopters. In the optical community, the most frequently used base curves vary from +5.50 to +7.25 but the better sunglass and fashion spectacle lenses are supplied with +6.00 diopter front curves. Thus, other factors set aside, it can be said that a base curve system which allows front curves between +5.00 and +7.25 diopters will result in as attractively finished spectacles as possible. With any base curve, however, strong minus lenses will have problems of thick edges and must be carefully beveled.

APPLICABILITY TO LARGE FRAMES

Large frames present both a cosmetic and optical challenge. If the lenses have curvatures which are shallower than those for which the frames were designed, the "wrap-around" effect which was intended will be lost and optical problems may also develop.

Steeper curvatures will help provide the sweeping wraparound effect while maintaining their optical axes in the straight-ahead direction. Prism and astigmatic problems can arise if lenses with shallow base curves are angled to create an attractive fitting. With a proper front curve, the same wrap-around effect can be obtained with the optical axis remaining in a more nearly staight-ahead position. While the straight-ahead requirement can be relaxed in moderate prescriptions, it remains an important fitting consideration.

Cosmetic appearance, in general, and the problems of large frames, in particular, further indicate that the steepness of plus lenses should be minimized and that minus lenses should be made with +6.00 curve fronts, or slightly steeper, especially in the new large eye sizes.

With conventional spherical surfaces, off-axis errors prohibit this type of lens; with aspherics applied according to this invention, it is possible to use them.

EYELASH CLEARANCE AND REFLECTIONS

Eyelash clearance and reflections have proved to be a problem in minus lenses for some patients. Steeper curves will reduce the incidence of these problems. However, with plus lenses problems of eyelash clearance are relatively few and the considerations of magnification, bulk and total thickness are the controlling factors.

APPLICATION OF THE ASPHERIC DESIGN

Having established hereinabove a guide for the selection of base curves which are independent of the traditional field of view or "marginal error" performance criteria, the following will illustrate at least some of the opportunities and advantages of the present design concept:

Taking the exemplary position that, for optimum lens performance, the meridional field of view errors should be controlled to avoid plus errors over 0.10 diopters and negative and astigmatic errors greater than 0.2 diopters at a 20° angle of view for the range 24–33 mm center of rotation (CR) distances from the ocular vertex V (FIG. 1) of a lens. Reference may be made to FIG. 2 for an illustration of the present design freedom.

As described hereinabove, FIG. 2 displays the variation of field errors with base curve and fitting distance (CR) with spherical surfaces, i.e. conventional geometry.

Accordingly, a base curve of approximately +3.37 diopters (CHOSEN PERFORMANCE) would yield a lens with limited plus power and an envelope of performance errors throughout the fitting range (CR24 to CR33) which is approximately as good as can be obtained and follows the general rule of controlling plus errors at the expense of minus errors.

Examining the data for the middle fitting distance (CR distance = 27mm), it can be seen that the sagittal and tangential errors be within the range of approximately +0.10 to −0.20 diopters but, one has substantially no choice of base curves.

According to this invention, an aspheric lens can be designed to yield this performance with a choice of base curves.

In an actual reduction to practice, a +6.25 nominal base curve was selected, and an aspheric surface designed to approximate the performance of the aforementioned +3.37 curve (FIG. 2) at a 27mm center of rotation distance and also meet the same tolerance for a range of center of rotation distance from 24 to 33 mm thus obtaining insensitivity to fitting distance and a more attractive lens with reduced distortion.

The total spread or "envelope" of errors for the aspheric design is indicated at the right side of FIG. 2. This zone indicates the spread of errors for the full range of fitting distances.

It is pointed out that use of the term "nominal" assumes that the concave curve of the lens is produced with standard tools having their working surfaces designed according to requirements of 1.53 refractive index lens material and that the front curve has the necessary compensations for thickness and tool index. Those wishing more detailed information relative to the use of the expression nominal as used in the art of ophthalmic lens design may refer to U.S. Pat. No. 3,434,781.

FIG. 5 contains field fan graphs which illustrate the performance of the lens of FIG. 2 from the center outward — field angles being the vertical ordinate and lens performance the horizontal. Three graphs are given — for 24, 28.5 and 33mm lens vertex to center of rotation distances.

The aforementioned +6.25 diopter base curve was used for this illustration. The fan plot for 28.5mm center of rotation (Stop) distance illustrates the aforementioned tangential and sagittal errors range at 30° viewing angle and fan plots on either side show that the performance for the 30° field of view remains within the predetermined tolerances.

The foregoing shows the freedom afforded by aspheric surfaces as used according to this invention to provide the "best possible" correction for the average center of rotation distance and an immunity to fitting distance such that, for the first time in the art, at least a very large percentage of spectacle lens wearers can be provided with high quality performance and attractively finished spectacles with front lens curves which are typical of the simplest prescriptions.

DESIGNING FOR CYLINDER PRESCRIPTIONS

The possibilities available for the selection of base curves in designing toric prescriptions are presented in FIG. 6. Here the typical lens designer's base curve selection graph is shown for plastic lenses (1.498 index of refraction) for the prescription −3.00 −2.00 cylinder for an angle of view of 20°. For ease and clarity of illustration, only the total envelope of errors is shown with cross hatching.

Using the diopter of error tolerances discussed above, the choice of nominal base curve is approximately +3.00 diopters. In order to keep plus errors small, i.e. within the said tolerances, this choice with little if any variation is necessary.

Applying the atoric design principles of this invention to achieve relative insensitivity to fitting distances, among other considerations already mentioned, a nominal base curve for the aspheric-atoric lens of +5.75 diopters may be selected. With this design the envelope of errors is shown in FIG. 6 (ATORIC PERFORMANCE ENVELOPE). Thus, the "field of view" performance of the "Best Spherical Base Curve" has been closely approximated using a base curve which has the several previously outlined advantages. It can be seen that the aspheric-atoric performs significantly better than a spherical design of similar base curve.

FIG. 7 shows the envelope of errors at 30° as it varies with base curve for the same lenses as shown in FIG. 6 for 20°. This figure graphically illustrates what can be done with atoric construction. Here again, one can gain the advantages of steeper curve and insensitivity to fitting distances while maintaining a total envelope of errors no greater than that for a single fitting distance with conventional spherical lenses.

The foregoing illustrates that with both spheres and torics, non-circular aspheric and atoric geometry allows a freedom of base curve selection. This freedom is used according to the invention to reduce distortion, sensitivity to fitting distance and to improve the appearance of minus prescriptions, i.e. the invention permits the selection of base curves for other than traditional field correction criteria.

Figure 9:
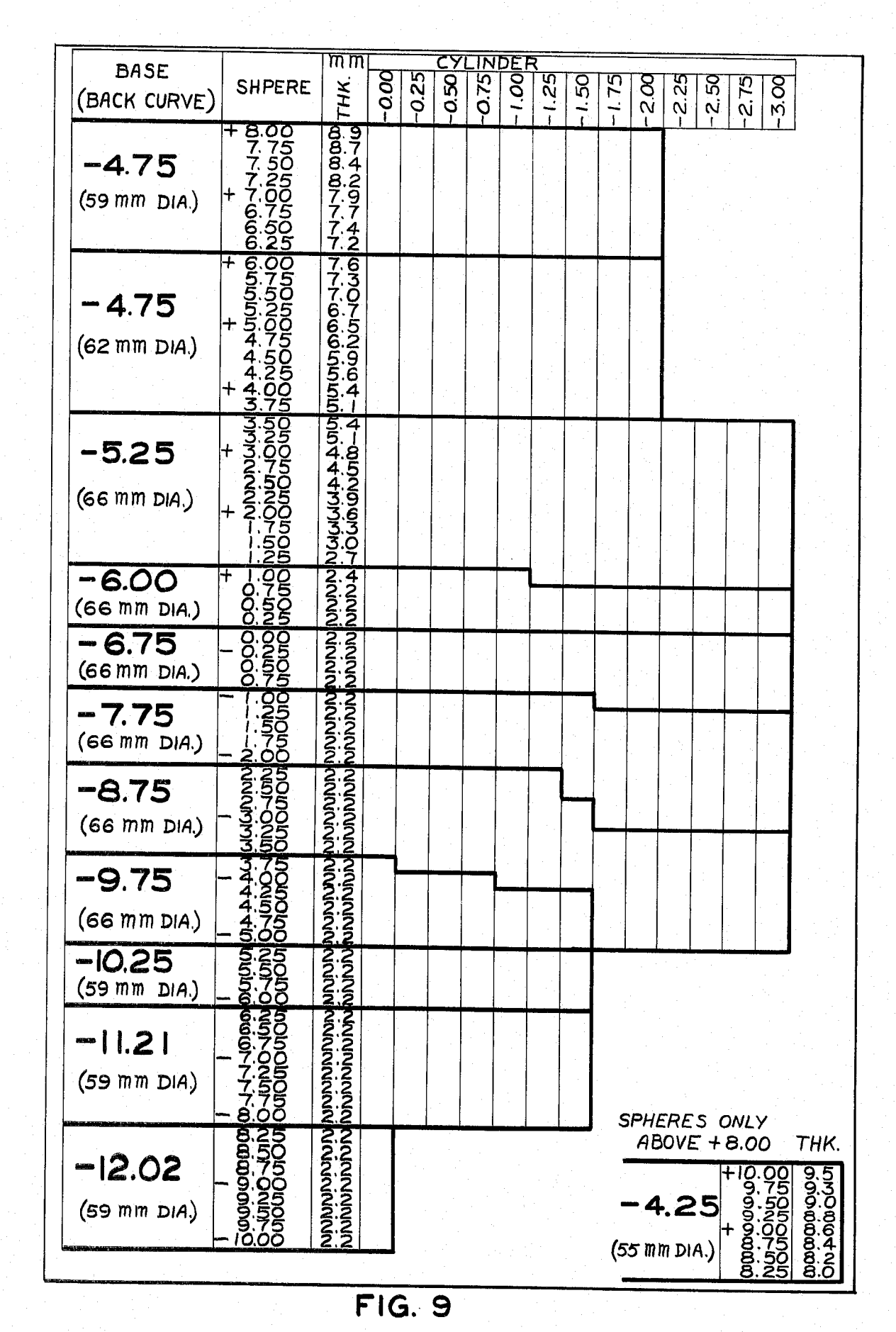

FIGS. 8A and 8B and 9 are tables defining representative layouts of groups of prescriptive powers and finished lens thickness, each group having its own base curve to be used on the rear or ocular side of respective lenses, nominal front curves being conventionally calculated. The groups are separated by heavy lines.

These charts are based upon an index of refraction of 1.498 (e.g. for conventional plastic lens materials) where, with 1.53 index standard tools, the required prescription will be achieved at the optical center of the lens in each case.

For those interested in details of conventional true power calculations, the true power of curve of the ocular surface $$(D_2) = \frac{(\text{true index} - 1)}{0.53} \times 1.53 \text{ value of } D_2 \text{ and}$$

$$1.53 \text{ Power of } D_1 \left\{ \begin{array}{c} \text{true power curve} \\ \text{of front surface} \end{array} \right\} = \frac{0.53}{\text{true index} - 1} \times \text{true power of } D_1.$$

$D_1$ can be calculated as follows:

$$\frac{1}{D_1} = \frac{1}{D_e - D_2} + \frac{t}{n}$$

Table 8A–8B sets forth data for providing lenses which are substantially insensitive to fitting distance (stop distance) when finished according to the invention. These lenses, particularly in the minus area, are appreciably steeper in curvature than prior art lenses.

For those (e.g. dispensers of opticians) who may desire somewhat shallower lens curves with approximately the same insensitivity to fitting distance Table 9 may be used.

In either case, once having compensated for the effect of lens thickness and the use of standard 1.53 index tools as just described, the asphericity required for field correction is determined.

The asphericity desired is the departure from a sphere or circular toric surface in the tangential meridion of an amount equal to but opposite in sign to the tangential error. It can be found by ray tracing and may be applied to either surface at the appropriate distance from the optical center or divided between the two surfaces.

Plus asphericities steepen the front surface curves and flatten the rear surface curves at the designated refractive ray intercept points.

Having assigned or distributed the required asphericity to either or both surfaces, the E value of the curve(s), front or back or both as required, can be computed knowing the central curvature Do and ray intercept point $y_1$ or $y_2$ (FIG. 1) as follows:

$$E = \left(\frac{n-1}{Do\, y}\right)^2 \left[1 - \left(\frac{Do}{Do + asph}\right)^{2/3}\right]$$

where:
- $e$ is the standard mathematical eccentricity of a conic section
- $E = 1 - e^2$
- $n$ = index of refraction
- Do = diopter value of the curve at its "pole" or lens axis (e.g. the optical center at front of the lens)
- $y$ = height of the zone for the angle of view under consideration. Considering 30° (FIG. 1), y varies from approximately 17.5mm for minus lenses but can be exactly determined by conventional ray trace procedure using spherical surfaces
- asph = a value opposite in sign to the tangential error referred to the reference circle C (FIG. 1) by standard ophthalmic lens ray trace procedures (Sagittal asphericity may also be used).

Exemplary values of asphericity found by ray trace with spherical surfaces for field errors at 30° and stop (CR) distance 30 mm are:

1. for +8.00 diopter sphere with −4.75 diopter ocular surface = 0.13 diopter tangential error
2. for −6.00 diopter sphere with 11.21 diopter ocular surface = 0.52 diopter tangential error Therefore, asphericity needed is of opposite sign in each case.

Additional examples of asphericities applicable to front (object side) or back (ocular side) or divided between each are as follows in 2 diopter steps for lenses of Table 8A–8B:

| Sphere | Asphericity in diopters at y = approximately 18mm at 30° angle of view and 30mm stop |
|---|---|
| +8 | −0.13 |
| +6 | +0.08 |
| +4 | +0.09 |
| +2 | +0.07 |
| 0 | +0.05 |
| −2 | −0.11 |
| −4 | −0.42 |
| −6 | −0.52 |
| −8 | −0.61 |

The following examples of tangential ($t$) and sagittal ($s$) errors in lenses of preselected base (ocular) and prescription curvatures both with and without aspheric correction illustrate the advantages of the present aspheric-atoric lens construction:

EXAMPLE I

Lens: −4.00 Diopter Sphere
Concave ocular curvature: −10.25 Diopter

Without aspheric correction:

| Viewing Angle | Stop | | 25mm | | 30mm | | 35mm | |
|---|---|---|---|---|---|---|---|---|
| | t | s | t | s | t | s | t | s |
| 20° | .056 | .064 | .132 | .087 | .186 | .104 | | |
| 30° | .172 | .156 | .333 | .205 | .442 | .238 | | |
| 40° | .426 | .309 | .682 | .386 | .843 | .435 | | |

With aspheric correction E=0.333 on a +5.944 Diopter front (object side) curve:

| Viewing Angle | Stop | | 25mm | | 30mm | | 35mm | |
|---|---|---|---|---|---|---|---|---|
| | t | s | t | s | t | s | t | s |
| 20° | −.079 | .021 | −.053 | .028 | −.056 | .025 | | |
| 30° | −.157 | .059 | −.104 | .073 | −.113 | .066 | | |
| 40° | −.225 | .133 | −.144 | .154 | −.162 | .042 | | |

With aspheric correction E = 1.224 on a −10.25 rear (ocular side) curve:

| Viewing Angle | Stop | 25mm | 30mm | 35mm |
|---|---|---|---|---|
| | t | t | t | t |
| 20° | −.040 | −.003 | −.006 | |
| 30° | −.053 | −.027 | −.040 | |
| 40° | −.010 | −.134 | −.144 | |

EXAMPLE II

Lens: +4.00 Diopter Sphere
Concave Ocular Curvature: −4.00 Diopters
Nominal Front Curvature: +8.00 Diopters Without aspheric correction:

| Viewing Angle | Stop | | 25mm | | 30mm | | 35mm | |
|---|---|---|---|---|---|---|---|---|
| | t | s | t | s | t | s | t | s |
| 20° | .030 | −.054 | −.023 | −.072 | −.060 | −.084 | | |
| 30° | .030 | −.135 | −.087 | −.171 | −.163 | −.195 | | |
| 40° | −.057 | −.273 | −.245 | −.328 | −.360 | −.362 | | |

With aspheric correction E = 1.074 Diopters on Front curvature:

| Viewing Angle | Stop | | 25mm | | 30mm | | 35mm | |
|---|---|---|---|---|---|---|---|---|
| | t | s | t | s | t | s | t | s |
| 20° | .059 | −.045 | .015 | −.060 | −.010 | −.068 | | |
| 30° | .099 | −.115 | .006 | −.144 | −.044 | −.159 | | |
| 40° | .083 | −.236 | .067 | −.279 | −.133 | −.298 | | |

EXAMPLE III

Lens: Spherical-Toric Construction +8.00 ⊃ −2.00
Concave Ocular Curvature: −4.75 diopters × −6.879 diopters
Angle of Intercept (view) = 30°
Stop (CR) Distance = 30mm Without aspheric correction:

| | | t | s | astigmatism |
|---|---|---|---|---|
| −4.75 sphere meridian | = | 0.14 | −0.45 | +0.59 |
| −6.879 cylinder meridian | = | −0.29 | −0.16 | −0.13 |

With aspheric correction
E = 0.964 (Front curvature)
and E = 0.25 (concave ocular curvature only in cylinder meridian):

| | | t | s | astigmatism |
|---|---|---|---|---|
| −4.75 sphere meridian | = | −0.028 | −0.498 | −0.47 |
| −6.879 cylinder meridian | = | −0.079 | −0.208 | −0.13 |

While the lens base curve selection tables 8A–8B and 9 and specific examples of lens performance referred to and incorporated hereinabove are based more particularly upon the use of lens materials (ophthalmic resins) having an index of refraction of 1.498 it should be understood that the subject matter of this invention applies equally to other lens materials of different refractive index. For example, substantially equivalent results can be obtained with glass of a 1.523 refractive index.

The foregoing illustrates the advantages provided by the use of the aspheric, atoric design of the present invention among which is the ability and freedom to select base curves for other than traditional field correction criteria, e.g. for reduction of geometric distortion, sensitivity to fitting distance, improvement in cosmetic appearance and other factors previously discussed.

Those skilled in the art will readily appreciate that various modifications and adaptations of the precise form of the invention here shown and described may be made to suit particular requirements. Accordingly, it is intended that such modifications which incorporate the novel concept disclosed are to be construed as coming within the scope of the appending claims or the range of equivalency to which they are entitled in view of the prior art. For example, the method shown for obtaining a surface of revolution which has a desired asphericity at the selected zone y from the formula for E which is set forth hereinabove, is a method which yields a surface having a conoidal cross section. However, any smooth non-circular curve which substantially meets the requirements for providing proper asphericity at selected distances outwardly from the center of the lens may be used. That is, by iterated methods, a surface having a cross-section described by the following expression can equally well be used:

$$x = ay^2 + by^4 + cy^6 \ldots$$

where:
$x$ = the depth of curve from a flat plane for any radial zone at a distance y from the pole or central axis of the surface.

The term $a$ in the foregoing formula expresses the central curvature and $b$ and $c$ can be determined by iterative methods to provide the desired asphericity at two different values of y. If additional control is required, additional terms may be added to the equation. At least two terms are recommended for smooth curvature. With the conic section approach, it is known that the asphericity for zones inwardly (i.e. toward the lens "pole" or axis) will be less than the asphericity for the selected outward zone. This assures a smooth departure from a sphere and gradual increase of asphericity from center of the lens to the selected outer zone.

It is further pointed out that the examples and discussions regarding methods of determining proper aspheric surfaces have been limited to control of tangential errors. This is advantageous for two reasons:
1. Tangential error normally changes much more rapidly with design change and angle of view change and with changes in fitting distance.
2. Tangential blur is further deteriorated by any lateral color blur due to lens prism at the chosen angle of view. Experienced lens designers with ray traces before them can easily estimate sagittal focus error when they determine tangential focus error.

In attempting to reduce plus errors at the expense of negative errors in minus lenses, the tangential error is usually more negative than sagittal error and in plus lenses the opposite is usually the case.

It is still further pointed out that in Examples I, II and III, given to illustrate the effect of the design approach, the residual tangential errors are not necessarily precisely those which would be included in a final design but show that a dramatic improvement is obtained over that obtained with conventional lenses with similar base curves.

We claim:
1. A general purpose ophthalmic lens series comprising lenses formed of a transparent material of known refractive index and providing a plurality of predetermined spherical prescriptive powers within a range of +10.00 diopters to −10.00 diopters combined with cylindrical prescriptive powers within a range of 0.00 diopters to at least −3.00 diopters, each of said lenses having disposed upon one surface thereof a concave base curve having at the lens axis a spherical dioptric power value as indicated for each combination of spherical and cylindrical prescriptive powers in the table of FIGS. 8A and 8B, nominal convex front curves being conventionally calculable, each lens further having on its combined front and back surfaces an aspheric correction E of net asphericity at an intercept of a 20° angle of view for a 30mm center of rotation distance such that residual tangential power errors are between +0.1 diopter and −0.2 diopter for spherical prescriptions and for both meridians of spherical prescriptions combined with cylinders of values from 0 to −4.00 diopters, said aspheric correction E being determined according to the formula E =

$$\left(\frac{n-1}{D_o \, Y}\right)^2 \left[1 - \left(\frac{D_o}{D_o + asph}\right)^{2/3}\right]$$

wherein $n$ is said known refractive index, $D_o$ is the diopter value of the curve of a surface under consideration taken at the lens axis, $Y$ is the height from the lens axis of the intercept of said angle of view and asph is a value opposite in sign to the tangential power error requiring aspheric correction at said intercept as may be determined by standard ophthalmic lens ray trace procedure.

2. An ophthalmic lens series according to claim 1 wherein said tangential power errors of from +0.1 diopter to −0.2 diopter are substantially maintained for a complete range of prescriptive center of rotation distances of from approximately 25mm to approximately 35mm.

3. An ophthalmic lens series according to claim 1 wherein said asphericity is applied only to said front surfaces of said lenses.

4. An ophthalmic lens series according to claim 1 wherein said asphericity is applied along the spherical meridian of lenses having cylindrical prescriptive powers.

5. A general purpose ophthalmic lens series comprising lenses formed of a transparent material of known refractive index and providing a plurality of predetermined spherical prescriptive powers within a range of +10.00 diopters to −10.00 diopters combined with predetermined cylindrical prescriptive powers within a range of 0.00 diopters to at least −3.00 diopters, each of said lenses having disposed upon one surface thereof a concave base curve having at the lens axis a spherical dioptric power value as indicated for each combination of spherical and cylindrical prescriptive powers in the table of FIG. 9, nominal convex front curves being conventionally calculable, each lens further having on its combined front and back surfaces an aspheric correction E of net asphericity at an intercept of a 20° angle of view for a 30mm center of rotation distance such that residual tangential power errors are between +0.1 diopter and −0.2 diopter for spherical prescriptions and for both meridians of spherical prescriptions combined with cylinders of values from 0 to −4.00 diopters, said aspheric correction E being determined according to the formula $E =$ $$\left(\frac{n-1}{D_o\,Y}\right)^2 \left[1 - \left(\frac{D_o}{D_o + asph}\right)^{2/3}\right]$$

wherein $n$ is said known refractive index, Do is the diopter value of the curve of a surface under consideration taken at the lens axis, Y is the height from the lens axis of the intercept of said angle of view and asph is a value opposite in sign to the tangential power error requiring aspheric correction at said intercept as may be determined by standard ophthalmic lens ray trace procedure.

6. An ophthalmic lens series according to claim 5 wherein said tangential power errors of from +0.1 diopter to −0.2 diopter are substantially maintained for a complete range of prescriptive center of rotation distances of from approximately 25mm to approximately 35mm.

7. An ophthalmic lens series according to claim 5 wherein said asphericity is applied only to said front surfaces of said lenses.

8. An ophthalmic lens series according to claim 5 wherein said asphericity is applied along the spherical meridian of lenses having cylindrical prescriptive powers.

9. A general purpose ophthalmic lens series comprising lenses formed of a transparent material of known refractive index and providing a plurality of predetermined spherical prescriptive powers within a range of +10.00 diopters to −10.00 diopters combined with predetermined cylindrical prescriptive powers within a range of 0.00 diopters to at least −3.00 diopters, each of said lenses having disposed upon one surface thereof a concave base curve having at the lens axis a spherical dioptric power value as indicated for each combination of spherical and cylindrical prescriptive powers in the table of FIGS. 8A and 8B, nominal convex front curves being conventionally calculable, each lens further having on its combined front and back surfaces an aspheric correction E of net asphericity at an intercept of a 30° angle of view for a 30mm center of rotation distance of a value between 0.00 Diopters and that required to produce a residual tangential power error lying between +0.1 and −0.2 diopter, said aspheric correction E being determined according to the formula $E =$ $$\left(\frac{n-1}{D_o\,Y}\right)^2 \left[1 - \left(\frac{D_o}{D_o + Asph}\right)^{2/3}\right]$$

wherein $n$ is said known refractive index, Do is the diopter value of the curve of a surface under consideration taken at the lens axis, Y is the height from the lens axis of the intercept of said angle of view and asph is a value opposite in sign to the tangential power error requiring aspheric correction at said intercept as may be determined by standard ophthalmic lens ray trace procedure.

10. A general purpose ophthalmic lens series comprising lenses formed of a transparent material of known refractive index and providing a plurality of predetermined spherical prescriptive powers within a range of +10.00 diopters to −10.00 diopters combined with predetermined cylindrical prescriptive powers within a range of 0.00 diopters to at least −3.00 diopters, each of said lenses having disposed upon one surface thereof a concave base curve having at the lens axis a spherical dioptric power value as indicated for each combination of spherical and cylindrical prescriptive powers in the table of FIG. 9, nominal convex front curves being conventionally calculable, each lens further having on its combined front and back surfaces an aspheric correction E of net asphercity at an intercept of a 30° angle of view for a 30mm center of rotation distance of a value between 0.00 diopters and that required to produce a residual tangential power error lying between +0.1 and −0.2 diopter, said aspheric correction E being determined according to the formula $E =$ $$\left(\frac{n-1}{D_o\,Y}\right)^2 \left[1 - \left(\frac{D_o}{D_o + asph}\right)^{2/3}\right]$$

wherein $n$ is said known refractive index, Do is the diopter value of the curve of a surface under consideration taken at the lens axis, Y is the height from the lens axis of the intercept of said angle of view and asph is a value opposite in sign to the tangential power error requiring aspheric correction at said intercept as may be determined by standard ophthalmic lens ray trace procedure.

11. A series of semi-finished ophthalmic lens blanks for use in forming finished individual lenses of a series of lenses within a range of spherical prescriptive powers of from +10.00 diopters to −10.00 diopters combined with cylindrical prescriptive power values within a range of from 0.00 diopters to at least −3.00 diopters wherein each of said semi-finished blanks has disposed upon one of its surfaces a base curve of a negative spherical dioptric power value combined with cylinder values as indicated for each combination of spherical and cylindrical prescriptive powers in the table of FIGS. 8A and 8B, said blanks being of greater thickness than finished thickness indicated said tables and said surface of each having said base curve of negative dioptric power value further having an aspheric correction E of an asphercity lying between zero and that required to yield a tangential power error between +0.1 and −0.2 for the range of prescriptions of said individual lenses intended to be produced from said blanks, said aspheric correction E being according to the formula $E =$ $$\left(\frac{n-1}{D_o\,Y}\right)^2 \left[1 - \left(\frac{D_o}{D_o + asph}\right)^{2/3}\right]$$

wherein $n$ is the refractive index of material of said blanks, Do is the diopter value of said base curve taken at the lens axis, $y$ is the height from the lens axis of the intercept of a preselected angle of view for a preselected center of rotation distance of a finished lens and asph is a value opposite in sign to a tangential power error requiring aspheric correction at said intercept as may be determined by standard ophthalmic lens ray trace procedure.

12. A series of semi-finished ophthalmic lens blanks for use in forming finished individual lenses of a series of lenses within a range of spherical prescriptive powers of from +10.00 diopters to −10.00 diopters combined with cylindrical prescriptive power values within a range of from 0.00 diopters to at least −3.00 diopters wherein each of said semi-finished blanks has disposed upon one of its surfaces a base curve of a negative spherical dioptric power value combined with cylinder values as indicated for each combination of spherical and cylindrical prescriptive powers in the table of FIG. 9, said blanks being of greater thickness than finished thickness indicated in said table and said surface of each having said base curve of negative dioptric power value further having an aspheric correction E of an asphericity lying between zero and that required to yield a tangential power error between +0.1 and −0.2 for the range of prescriptions of said individual lenses intended to be produced from said blanks, said aspheric correction E being according to the formula $E =$ $$\left(\frac{n-1}{Do\ y}\right)^2 \left[1 - \left(\frac{Do}{Do + asph}\right)^{2/3}\right].$$

wherein $n$ is the refractive index of material of said blanks, Do is the diopter value of said base curve taken at the lens axis, $y$ is the height from the lens axis of the intercept of a preselected angle of view for a preselected center of rotation distance of a finished lens and asph is a value opposite in sign to a tangential power error requiring aspheric correction at said intercept as may be determined by standard ophthalmic lens ray trace procedure.

13. An ophthalmic lens having a spherical dioptric power value lying within a range of from approximately 0.00 diopters to approximately −10.00 diopters combined with a cylindrical prescription power lying within a range of from 0 to approximately −4.00 diopters, said lens being formed of a material of known refractive index and having on at least one of its front and back opposite surfaces an aspheric correction E, said opposite surfaces being in such spaced relation to each other as to provide a predetermined axial thickness for said lens, the curvature of said back surface having along at least a base meridian thereof a predetermined negative curve value which lies within a range of from approximately −6.00 diopters for the weaker power of said lenses to −12.02 diopters for the stronger power of said lenses, said aspheric correction E being of a net asphercity at an intercept of a 20° angle of view for a 30mm center of rotation distance such that residual tangential power error is between +0.1 diopter and −0.2 diopter for a spherical prescription and for both meridians of a spherical prescription combined with a cylinder power of value from 0 to −4.00 diopters, said aspheric correction E being according to the formula $E =$ $$\left(\frac{n-1}{Do\ Y}\right)^2 \left[1 - \left(\frac{Do}{Do + asph}\right)^{2/3}\right]$$

wherein $n$ is said known refractive index, Do is the diopter value of the curve of said surface having said aspheric correction taken at the lens axis, $Y$ is the height from the lens axis of the intercept of said angle of view and asph is a value opposite in sign to the tangential power error requiring aspheric correction at said intercept as may be determined by standard ophthalmic lens ray trace procedure.

14. An ophthalmic lens according to claim 13 wherein said range of tangential power error of from between +0.1 diopter and −0.2 diopter is maintained for a center of rotation distance range of from approximately 25mm to 35mm.

15. An ophthalmic lens according to claim 13 wherein said asphericity is applied only to said front surface of said lens.

16. An ophthalmic lens according to claim 13 wherein said asphericity is applied to said back surface of said lens.

17. An ophthalmic lens having a spherical dioptric power value lying within a range of from approximately 0.00 diopter to approximately −10.00 diopters combined with a cylindrical prescription power lying within a range of from 0 to approximately −4.00 diopters, said lens being formed of a material of known refractive index and having on at least one of its front and back opposite surfaces an aspheric correction E, said opposite surfaces being in such spaced relation to each other as to provide a predetermined axial thickness for said lens, the curvature of said back surface having along at least a base meridian thereof a predetermined negative curve value which lies within a range of from approximately −6.00 diopters for the weaker power of said lenses to −12.02 diopters for the stronger power of said lenses, said aspheric correction E being of a net asphericity at an intercept of a 20° angle of view for a 30mm center of rotation distance of a value between 0.00 diopters and that required to produce a residual tangential power error lying between +0.1 and −0.2 diopter, said aspheric correction E being according to the formula $E =$ $$\left(\frac{n-1}{Do\ Y}\right)^2 \left[1 - \left(\frac{Do}{Do + asph}\right)^{2/3}\right]$$

wherein $n$ is said known refractive index, Do is the diopter value of the curve of said surface having said aspheric correction taken at the lens axis, $y$ is the height from the lens axis of the intercept of said angle of view and asph is a value opposite in sign to the tangential power error requiring aspheric correction at said intercept as may be determined by standard ophthalmic lens ray trace procedure.

18. An ophthalmic lens series according to claim 1 wherein said aspheric correction is applied partially to said concave base curve and partially to said convex front curve of a lens of said series.

19. An ophthalmic lens series according to claim 5 wherein said aspheric correction is applied partially to said concave base curve and partially to said convex front curve of a lens of said series.

* * * * *